United States Patent [19]
Ditcher

[11] 4,159,829
[45] Jul. 3, 1979

[54] GASKET SEAL BETWEEN SEWER PIPE AND MANHOLE OPENING

[75] Inventor: John Ditcher, Langhorne, Pa.

[73] Assignee: A-Lok Products Corporation, Trenton, N.J.

[21] Appl. No.: 832,015

[22] Filed: Sep. 9, 1977

Related U.S. Application Data

[62] Division of Ser. No. 710,264, Jul. 30, 1976, Pat. No. 4,073,048.

[51] Int. Cl.² .................... F16L 21/02; F16J 15/32
[52] U.S. Cl. .................... 277/189; 277/34.3; 277/207 A; 277/165; 277/218; 285/230; 285/231
[58] Field of Search ............ 285/110, 192, 189, 230, 285/231, DIG. 11, DIG. 19; 277/207 A, 34.3, 189, 226, 207 A, 165, 186, 177, 214, 218

[56] References Cited

U.S. PATENT DOCUMENTS

| | | | |
|---|---|---|---|
| 2,360,731 | 10/1944 | Smith | 277/177 |
| 2,662,053 | 12/1953 | Brown | 202/243 |
| 3,661,197 | 5/1972 | Peterson | 277/226 X |
| 3,787,061 | 1/1974 | Yoakum | 277/207 A X |
| 3,832,438 | 8/1974 | Ditcher | 285/230 X |
| 3,973,783 | 8/1976 | Skinner et al. | 277/DIG. 2 X |

FOREIGN PATENT DOCUMENTS

| | | | |
|---|---|---|---|
| 539225 | 4/1957 | Canada | 277/218 |
| 711146 | 6/1965 | Canada | 277/207 A |
| 1475581 | 1/1969 | Fed. Rep. of Germany | 277/DIG. 2 |
| 1440175 | 4/1966 | France | 277/207 A |
| 1440198 | 4/1966 | France | 277/209 |
| 290612 | 6/1965 | Netherlands | 285/231 |

*Primary Examiner*—Robert S. Ward, Jr.
*Attorney, Agent, or Firm*—Andrew R. Klein

[57] ABSTRACT

An improved seal for closing the space between a pipe and the wall of an opening through which it passes, using a linear extrusion of elastomeric material, of predetermined length to form a gasket. The extrusion has a hollow, pear-shaped head formed integrally with a T-shaped anchoring flange. It is curled into the form of a right cylinder, and its mating ends are vulcanized together. The pear-shaped portion is deflected radially inwardly and the T-shaped anchoring flange outwardly, the latter being then embedded in concrete used to wall the opening for the pipe. The pear-shaped portion is free in space and provides a pneumatic cushion for the pipe.

4 Claims, 8 Drawing Figures

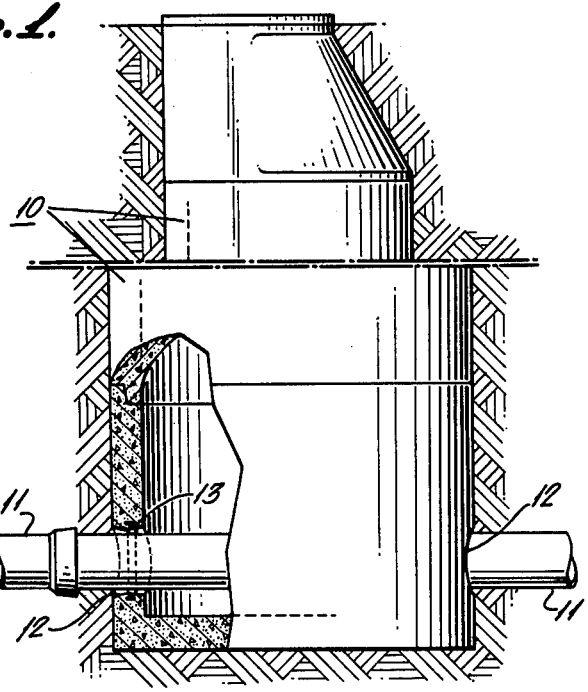
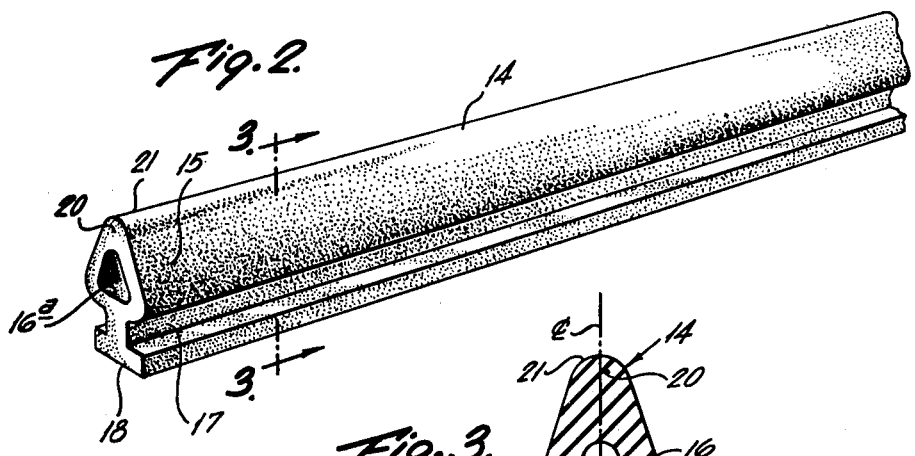
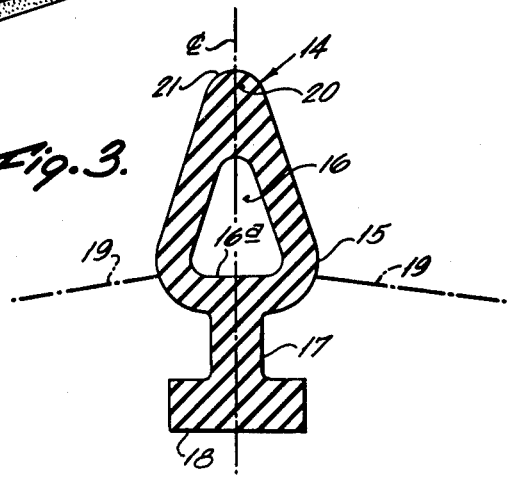

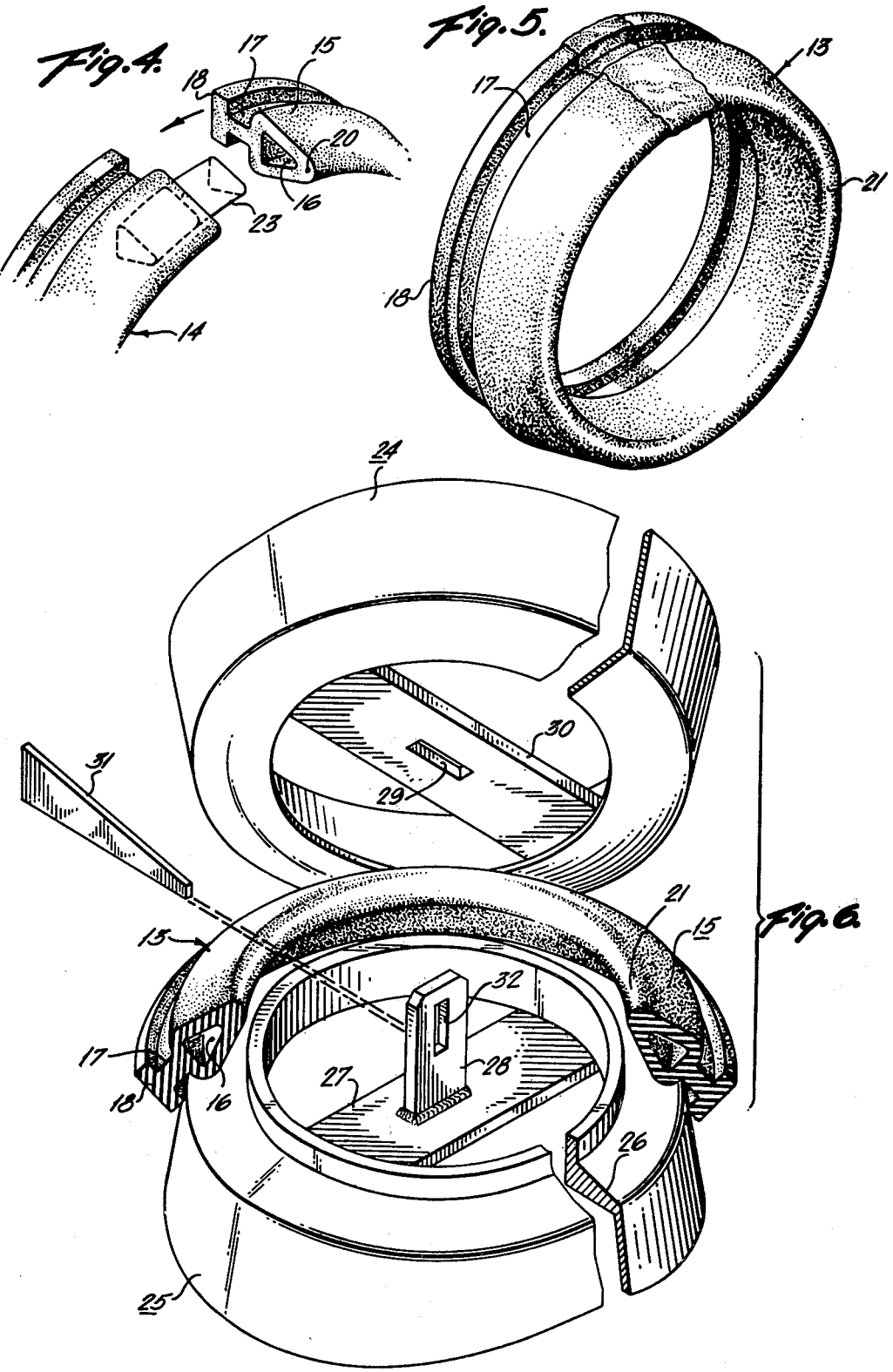

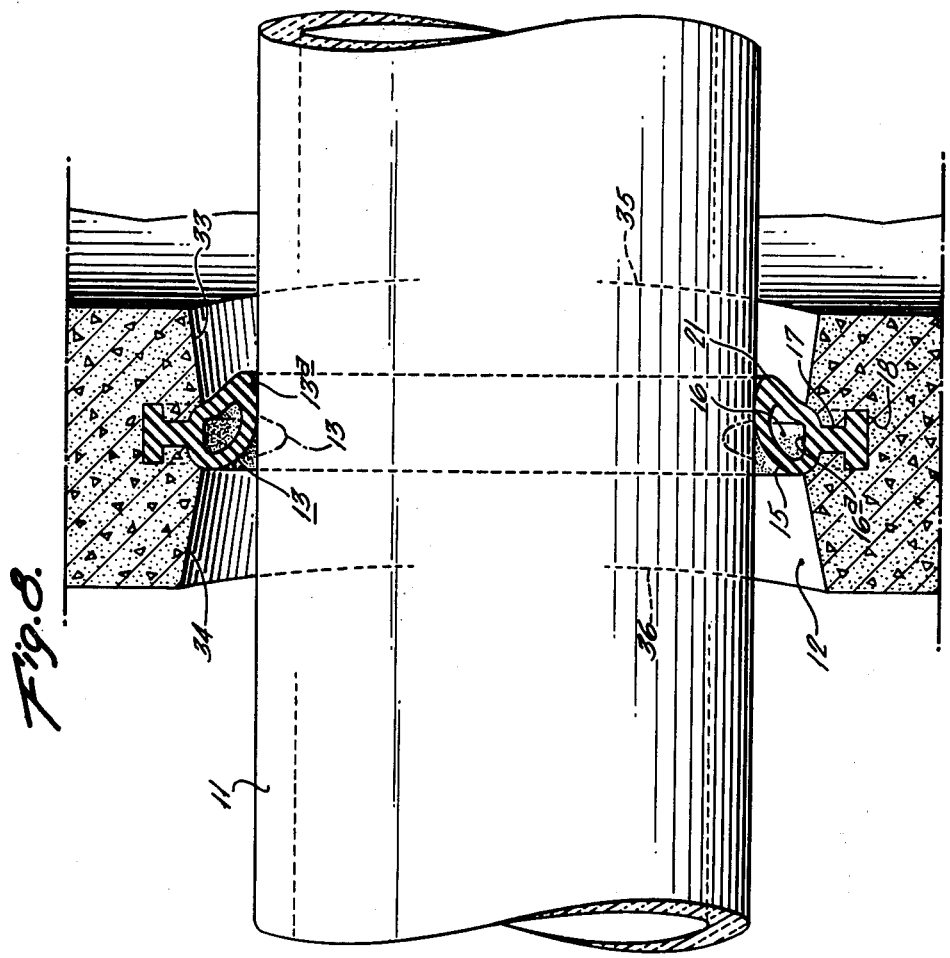
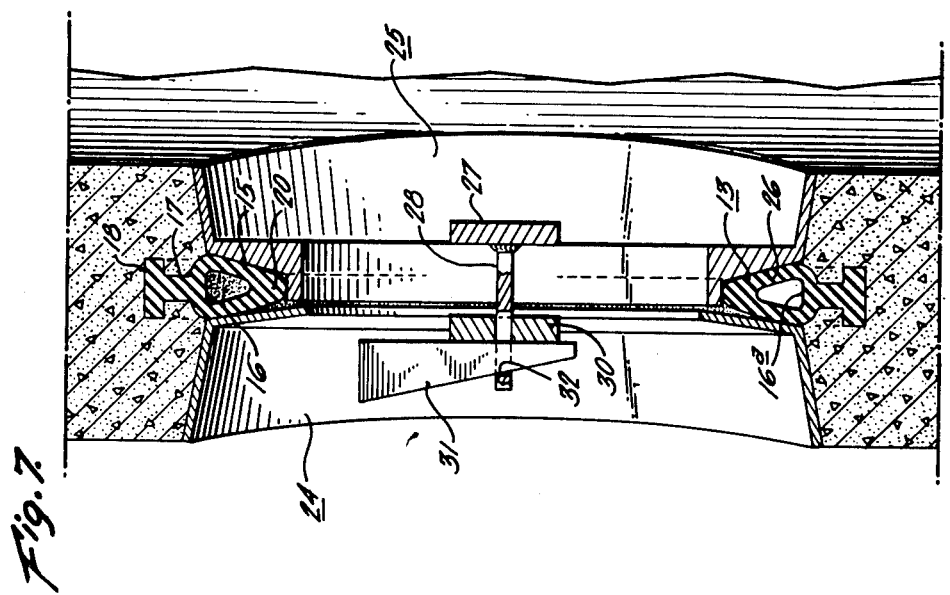

GASKET SEAL BETWEEN SEWER PIPE AND MANHOLE OPENING

This is a division of application Ser. No. 710,264, filed July 30, 1976 now U.S. Pat No. 4,073,048, issued Feb. 14, 1978.

This invention deals with the installation of sanitary sewers and is particularly concerned with the provision of an improved form of gasket seal for closing the space between a sewer pipe and the inner periphery of an opening in the wall of a manhole through which that pipe passes.

The new form of gasket represents an improvement in the structure shown in my U.S. Pat. No. 3,813,107, issued May 28, 1974. That patent shows a gasket made from an extruded rubber strip, having a cross section in the shape of a capital A. When properly positioned in the manhole opening, the apex of the A is exposed, and extends radially inwardly to make firm contact with the surface of the pipe. The legs of the A extend outwardly, and are embedded in cementitious material which lines the opening in the manhole wall, as is shown in my U.S. Pat. No. 3,796,406, dated Mar. 12, 1974. The method of constructing such a seal is described in my U.S. Pat. No. 3,832,438, dated Aug. 27, 1974.

In these earlier patents, in which the elastomeric gasket was made from an extrusion in the cross-sectional form of a capital A, it required some distortion of the gasket, as explained in column 4, lines 22 et seq., of U.S. Pat. No. 3,813,107, to fit this gasket onto the mold rings, but the webs or skirts (corresponding to the lower legs of the A) were fairly flexible, so the difficulty of installation proved to be slight. In spite of the provision of concentric serrations in the web or skirt portions of the gasket, however, there seemed to be a possibility that, under severe conditions, the pipe might impose so great a stress on the gasket as to cause the rubber in the skirt portion under tension to thin out and pull away from the surface of the concrete in which it was embedded. In order to reduce this potential area of vulnerability, experimentation with other shapes of extrusions was carried out.

The basic problem was to provide an improved technique for positively and permanently anchoring the gasket in the cementitious material which defines the inner surface of the opening, without sacrificing the numerous advantages afforded by the presence of the double-walled head portion, which has a continuous circular cavity therein. This cavity is walled with rubber or similar elastomer, and its walls are air-tight, so that it affords a pneumatic cushion.

The problem did not appear to be solvable by the use of individually molded unitary gasket washers*, since they lacked sufficient resistance to compression in their lower, inner portion, which carries the major load, and were too subject to peripheral separation from the pipe in their upper portions. Furthermore, such washers would have to be stocked in many sizes. Nor did it appear to be feasible or practical to mold a unitary gasket ring in the form of a washer with a continuous circular cavity, such as could be made by using the A-shaped extrusion.

\* "washers" as used herein, refers to centrally-apertured articles of disk-like shape.

The endless cavity of the A-section gasket provided an answer to the compressibility problem in the pipe-contacting part, but the difficulty of installation, because the diameter of the inner opening is so much less than the diameter at the extreme ends of the webs or "legs" of the A, discouraged any attempt to use cross-sectional forms which would have to accommodate an even greater difference between the inner and the outer diameter of the washer-like gasket, in order to complete installation.

The cross-sectional pattern of the anchoring member of the molded washer shown in the Netherlands patent to Raatjes, No. 290,612 of 1963, seemed to be likely to remain embedded in its surrounding concrete, no matter how severe the stress upon it might become. But there seemed to be no way to convert a lineal extrusion having this cross-sectional shape into a disk-like washer, and no practical way to provide the endless cavity unless it could be formed by extrusion.

Combining an extruded triangular head having an air-tight cavity throughout its length with a T-shaped anchoring part seemed to be quite out of the question, for this would greatly increase the overall height of the extrusion, and thus create an even greater difference between inner and outer diameter of the finished washer than the A-shaped gasket entailed. It would apparently be practically impossible to roll the gasket into place in the molding rings.

It has now been discovered that a seal having all of the desired properties can be made by utilizing an extrusion having a pipe-contacting part which, instead of being A-shaped, is pear-shaped in section and is unitarily provided with a T-shaped anchoring part, the stem of the T being united with bottom of the pear-shaped part and affording, when longitudinally considered, a web of substantial height and thickness. Such an extrusion can be used effectively if handled in the manner hereinafter set forth.

The extrusion is cut to the desired size, and is then curved into the shape of a right cylinder, and its ends are vulcanized to each other. This cylinder is positioned on the inner portion of a mold, and is rolled inwardly, so that the pear-shaped pipe-contacting portion is deflected radially inwardly and the outer flange (corresponding to the cross-bar of the T in section) is pulled outwardly, in a manner analogous to that employed in fitting the bead of a tire to the metal rim of an automobile wheel. When the inward deflection of the pipe-contacting part has progressed sufficiently to allow it, the complementary part of the mold is slid into place, and its clamp is drawn up, applying pressure as needed, to force the tubular part of the ring into the groove which extends peripherally of the mold.

A suitable mold ring for utilizing the novel gasket of this invention most effectively is the two-part mold which is described and claimed in U.S. Pat. No. 3,796,406. As there seen, the mold consists of inner and outer shells of frustoconical shape which are so configured that when assembled they define between then a peripheral groove which encloses the apex of the A, leaving the legs of the A free. In the present invention, the pear-shaped head of the extrusion is received by the peripheral groove formed by the mold rings, and the T-shaped flange projects radially outwardly therefrom. Concrete or other cementitious material is then applied to enclose the flange and define the peripheral wall of the opening in the manhole wall. Upon separation and removal of the mold parts, the cementitious material lining the opening covers the peripheral flange and embeds it, but the tubular pear-shaped portion is exposed, and yields to receive the pipe inserted therein.

One of the advantages of the present invention is the unexpected discovery that extrusions having the cross-sectional form described can often be used with pipes of different sizes, without altering their cross-sectional dimensions. All that is necessary is to change the length of the extrusion and the diameter of the mold rings. This capacity to coact with pipe of many different sizes is believed to be due, in part at least, to the fact that the manner of use places considerable compression on the inner portion of the gasket, and causes tension on its periphery. As a consequence, the gasket of the present invention hugs the pipe more tightly than would be the case if the gasket were initially molded as an apertured disk or washer.

It must be realized that the part of the gasket which lies at the bottom of the opening when in use will have to sustain most of the load of the pipe and its contents, and in addition will have to resist environmental stresses, which may be imposed upon the pipe outside of the manhole by the weight of the fill, or by impacts due to traffic shock, or by the dead weight of passing vehicles. If an ordinary washer is used, it may yield too much under these stresses, and become overly compressed at the bottom of the opening. The pipe may then pull away from the gasket at the upper part of the opening, thereby allowing fluid to pass the seal. Since the stresses imposed may sometimes be measured in thousands of pounds, particularly where the pipe is large — say 24" or 30" in diameter, it is difficult to employ a molded gasket ring which will manifest both sufficient resistance to compression at the bottom of the opening and sufficient capacity for expansion at the top.

The pear-shaped head of the gasket of the present invention is remarkably adapted to meet this problem. Its walls are of substantial thickness, which means that a sufficient mass of elastomeric material will be present to carry the weight imposed, and the volume of the circular cavity is sufficient to afford increased flexibility while the pipe is being installed. At the same time, elimination of the legs (or webs) of the A of the prior device avoids formation of a thin edge at the interface with the concrete, and the rounded edges of the pear-shaped bottom permit a self-accommodating rolling movement under axial stress.

The other major need is to ensure that the gasket ring is so firmly anchored in the concrete as to resist any stress which might tend to dislodge it. This is ensured by the deep embedding of the T-section flange in the surrounding concrete.

The entire gasket is subjected to substantial distortion as it is deflected from the cylindrical form which is first produced into an apertured disk or washer. Because the inner diameter of the opening formed by deflecting the cylinder walls is substantially less than the cut length of the extrusion, the inner edge of the gasket will be under compression, and conversely, because the outer diameter of the washer-shaped finished gasket is substantially greater than the length of the cut extrusion, it will be under considerable tension. These twin forces cause the gasket to hug very tightly the pipe which it surrounds.

How these and other objectives, which will occur to those skilled in the art, are to be attained will be apparent from a consideration of the description which follows, and from reference to the accompanying drawings, which illustrate the preferred embodiment of the invention, and in which:

FIG. 1 is an elevation, partly in section, of a manhole structure, with the gasket seal of this invention in position;

FIG. 2 is a perspective view of an extrusion having the contours of the present invention;

FIG. 3 is a transverse section on the line 3—3 of FIG. 2;

FIG. 4 is a perspective view, showing the extrusion being prepared for use as a gasket;

FIG. 5 is a perspective view of the completed gasket;

FIG. 6 is a perspective view showing upper and lower mold forms, with the gasket ring of FIG. 5 in process of installation between them;

FIG. 7 is an elevational view, partly in section, showing the gasket of FIG. 5 in place in its mold; and FIG. 8 is a vertical sectional view of the completed installation, with the sewer pipe in place.

Turning now to FIG. 1: The manhole structure 10 is shown with the sewer pipe 11 passing through it by way of the openings 12,12. The gasket 13 of the present invention is shown in the distorted position which it assumes upon insertion of the pipe 11.

The gasket 13 is formed from a continuous extrusion 14 of rubber or the like, illustrated in FIG. 2. Preferably, it conforms to ASTM Specification C 443-63T. As seen in the cross-section of FIG. 3, the general configuration of the extrusion is one in which there is a head portion 15 which is pear-shaped and encloses a symmetrical hollow or cavity 16. Extending from a mid-part of the outer surface of the pear-shaped head is a web 17 which interconnects the head 15 with a base flange 18 which is normal to the vertical center line CL of the extrusion. As seen in FIG. 2, the form of the extrusion in lengthwise elevation is that of a tubular head 15 connected by a vertical web 17 to the longitudinal flange 18.

It is the apex 20 of the head 15 which makes first contact with a pipe 11 being inserted in the manhole opening 12. To facilitate insertion of the pipe, the apex 20 is rounded, as at 21. During installation, the base or anchoring portion, which consists of the web 17 and the flange 18, are embedded in concrete or other cementitious material. The finish line of the concrete which will ultimately be present has been suggested by the dashed lines 19—19, added to FIG. 3. This illustrates the fact that the outer angles of the pear-shaped part are rounded and the concrete is emplaced in such a way as to avoid a sharp edge of contact with the lower portions of the pear-shaped tube. Thus a possibility of accommodating some rolling movement of the tubular portion of the gasket is provided, to reduce stress on insertion of the pipe. The cavity 16 within the tube is preferably symmetrical with its outer contour, and is so dimensioned as to provide a fairly substantial wall thickness. The web 17 spaces the base of the head from the top of the flange sufficiently to afford a substantial channel to be filled with concrete.

The proportions of the various parts of the extrusion are, in the preferred embodiment of this invention, substantially as follows: if the wall thickness be taken as 2x, then 3x is the thickness of the flange 18 and also the thickness of the web 17; furthermore, the radius of the rounded corners of the pear shape is also 3x; 4x is the height of the web, and 6x is the widest dimension of the cavity 16. The total height of the base (web plus flange thickness) is 7x, which is also the height of the cavity 16. The width of the base flange is 8x, and the widest part of the pear-shaped head is 11x. The height of the pear-shaped portion is 14x. The exterior surfaces of the pear-shaped portion diverge at an angle of about 40° (20° on each side of the vertical) and the base angles are 70° each. The area of the rubber in the walls of the pear-shaped head is preferably about two and a half times the area of the cavity.

It is, of course, possible to vary these proportions within limits, but they have yielded excellent results for most installations. Abnormal conditions, such as severe traffic load, may justify some changes, such as increasing wall thickness without altering other dimensions.

In order to convert the rectilinear extrusion into a ring gasket, it is first necessary to cut a piece of it to the desired lengths. Experience has shown that handling of the completed ring is easier if the length of the extrusion is 3.26 times the diameter of the pipe to be fitted.

The cut section of the extrusion is then curled into the form of a right cylinder, and its ends are brought together and vulcanized, as seen in FIG. 4. In order to avoid distortion of the tubular portion of the extrusion during vulcanization, it is desirable to insert a dowel pin 23, shaped to fit the cavity, into the adjacent ends of the tube. The vulcanizing clamps are applied when the tube ends have been brought firmly together. The dowel pin is made of some readily-frangible material, such as plaster of Paris, and after vulcanization has been completed, it is reduced by hammering to a fine powder, which does not block the continuous cavity in the head portion of the gasket.

FIG. 5 shows the completed ring, after vulcanization and before installation in the mold ring to be next described. It will be noted that the vertical axis of the extrusion is parallel to the cylinder axis, whereas its intended use requires that the extrusion assume the character of a disk, extending at right angles to the cylinder axis. In order to effect the indicated change in form, it is necessary to deflect the walls of the cylindrical gasket into a plane which extends transversely of the axis of the ring, and then to secure the distorted and deflected base flange by embedding it in concrete or similar cementitious material, with the tubular pear-shaped portion extending radially inwardly to engage the pipe which is to be mounted therein.

To accomplish these procedures, it is best to use a mold of the type described and claimed in U.S. Pat. No. 3,796,406, to which reference may be had for full details. A brief description will suffice for present purposes.

FIG. 6 illustrates the general form of the mold referred to. It consists of two frustoconical rings 24,25, adapted to be clamped together and configured to embrace, between them, the tubular, pear-shaped portion 15 of the gasket. FIG. 7 is a sectional view of the assembled mold, but with the parts in inverted position as compared to FIG. 6. This clearly shows how the mold rings provide space between them to receive the tubular, pear-shaped part of the gasket.

Returning to FIG. 6, it will be seen that the gasket ring shown in FIG. 5 has been stretched to fit the mold ring 25, and is being deflected radially inwardly, with the tubular pear-shaped part about to be forced still further down into contact with the mold flange 26 in the mold ring 25. A truss 27 spans the ring 25 diametrally, being welded to a lug 28 which is long enough to slip through and beyond the aperture 29 in the corresponding truss 30 which spans the mold ring 24. A quoin key 31 is used to urge the mold rings together, being inserted into the keyway 32 in the lug 28 after the rings have been brought together.

FIG. 7, in addition to showing the gasket ring in its final position in the assembled mold, also shows the base flange 18 and the web 17 fully embedded in the concrete. The tubular portion of the gasket, being within the mold, will be free in space after the mold is removed. This figure illustrates the relationship of the concrete to the pear-shaped tube, indicated by the dashed lines 19—19 in FIG. 3. The concrete should reach fairly well up on the lower rounded corners of the tube, but not so far as to permit the formation of a "feather-edge". Indeed, it is believed to be desirable to so form the mold as to limit the concrete to a level approximately the same as the upper surface 16a of the base of the cavity, so that the gasket may roll a little under the stress imposed by insertion of the pipe 11.

In FIG. 8, the mold rings have been separated and removed and the pipe 11 has been inserted. This causes a fairly extensive distortion of the tubular part of the gasket, more or less schematically indicated at 13a. The dot-and-dash outline 13 in FIG. 8 indicates the position of the gasket before the pipe 11 is inserted.

The sloping conical faces 33, 34 are provided for the purpose of accommodating misalignment of the pipe 11. The curvature of the dash lines 35,36 indicates the projected circumference of the manhole wall which lies above and below the locus of the opening 12.

For convenience, it may be desirable to conduct much of the work involved in the shop rather than in the field. If this is desired, the mold may be assembled within an outer form, so that the concrete in which the flange is embedded is in the shape of a tubular concrete plug, preferably cylindrical, of a size to fit the opening in the manhole wall. It is then carried to the site, and cemented into place within the opening.

In any event, after the gasket is in place and the concrete is sufficiently cured, the pipe 11 is inserted through the gasket 13, causing substantial distortion of the tubular portion, as suggested at 13a. This greatly extends the contact area, so that there is very little chance that minor pits or defects in the pipe will escape the sealing action.

The wall thickness of the head and the size of the cavity within it are so related as to ensure the presence of enough rubber or rubber-like material to sustain the weight imposed and yet cushion the load to protect against shocks and momentary stresses. At the same time, the tension imposed on the circumference of the gasket ensures that tight contact will be maintained at the upper surface of the pipe, no matter how extensively the tubular head may be compressed at its lower portion.

This combination of factors, including the expanded area of contact and the cushioning action, protect against minor defects in the pipe surface. Should there be a situation in which the pipe at the locus of the gasket is seriously out of round, or locally flattened, it may be desirable to increase the tightness of the seal by injecting a non-hardening, self-sealing material into the circular cavity, using a syringe with a fine point for this purpose. The material injected is placed under sufficient pressure to expand the tubular head into close contact with the pipe. The pressure needed may be supplied mechanically by the syringe, or chemically, as by using urethane and a foaming agent, in controlled proportions. When the syringe is withdrawn, the self-sealing material inserted closes the opening made by the point of the syringe. Needless to say, this expansion-producing material is mot employed until the pipe is in place.

It is noted that the contours of the A-shaped gasket previously used are significantly less well adapted to the need than is the new contour. The inverted "T" which forms the base element of the extrusion is so firmly embedded in concrete as to be practically incapable of removal, since the thrust imposed by insertion of the pipe is substantially normal to the web 17, and is transmitted through a very substantial body of rubber-like material, whereas the thrust, when using the A-shaped washer, is almost parallel to the leg of the A which is first contacted by the entering pipe, thus incurring the likelihood that the leg (or skirt portion) will be stretched and thinned out, and possibly torn out by the roots, so to speak. The rounding of the lower corners of the pear-shaped contour, in contrast, permits the gasket to roll a little to accommodate stress, while the embedding of the T-shaped anchoring part of the gasket positively prevents dislodgement. The avoidance of any feather-edge at the interface between gasket and concrete eliminates any tendency of the concrete to break away or chip out in that location.

I claim:

1. For use in forming a fluid-tight seal between a sewer pipe and an opening in a manhole through which said pipe passes, a length of a linear extrusion of elastomeric material having a hollow tubular head portion of pear shape in cross section and a foot portion integral therewith, comprising a base flange portion and a web portion of substantial thickness connecting the mid-region of said flange portion with the mid-region of the lower face of the head portion, whereby to provide a pair of longitudinally-extending channels disposed on opposite sides of said web portion and adapted for embedment in cementitious materials between the facing surfaces of the head portion and the flange portion, said length of the extrusion being curved and spliced in the form of a right cylinder with the height of the extrusion extending in an axial direction.

2. The extrusion of claim 1 in which the hollow is symmetrical with the external contour of the head portion.

3. The extrusion of claim 1 in which the cross-sectional area of the tubular head portion is about two and a half times the cross-sectional area of the hollow.

4. For use in forming a fluid-tight seal between a pipe and a wall opening through which said pipe passes, an extrusion of elastomeric material having a head of pear shape in cross-section and a foot portion comprising flange structure extending laterally of a plane x containing the long axis of the head portion, said flange structure being integrally united to the base of the head portion by web means lying generally in plane x, the extrusion being cut, curled and spliced into the general form of a right cylinder, with the plane x being parallel to the cylinder axis.

* * * * *